(12) United States Patent
Lee

(10) Patent No.: US 10,858,288 B2
(45) Date of Patent: Dec. 8, 2020

(54) ARTIFICIAL MARBLE PRODUCTION DEVICE AND ARTIFICIAL MARBLE PRODUCED USING SAME

(71) Applicant: COSS CO., LTD, Gyeongsangnam-do (KR)

(72) Inventor: Sang Gon Lee, Gyeongsangnam-do (KR)

(73) Assignee: COSS CO., LTD., Gyeongsangnam-Do (KR)

( * ) Notice: Subject to any disclaimer, the term of this patent is extended or adjusted under 35 U.S.C. 154(b) by 0 days.

(21) Appl. No.: 15/777,204

(22) PCT Filed: Jun. 21, 2017

(86) PCT No.: PCT/KR2017/006502
§ 371 (c)(1),
(2) Date: May 17, 2018

(87) PCT Pub. No.: WO2018/048069
PCT Pub. Date: Mar. 15, 2018

(65) Prior Publication Data
US 2019/0177226 A1 Jun. 13, 2019

(30) Foreign Application Priority Data
Sep. 6, 2016 (KR) .................. 10-2016-0114269

(51) Int. Cl.
*C04B 111/54* (2006.01)
*B28B 17/02* (2006.01)
(Continued)

(52) U.S. Cl.
CPC .............. *C04B 26/18* (2013.01); *B28B 1/005* (2013.01); *B28B 17/02* (2013.01); *B29C 67/244* (2013.01);
(Continued)

(58) Field of Classification Search
None
See application file for complete search history.

(56) References Cited

U.S. PATENT DOCUMENTS 5,364,672 A * 11/1994 Schultze-Kraft ..... B29C 67/245
428/15
9,186,819 B1 * 11/2015 Grzeskowiak, II ....... B44F 9/04
(Continued)

FOREIGN PATENT DOCUMENTS

CN 1509861 A 7/2004
CN 102069528 A 5/2011
(Continued)

OTHER PUBLICATIONS

PCT/KR2017/006502. International Search Report & Written Opinion (dated Aug. 29, 2017).

*Primary Examiner* — Jeffrey M Wollschlager
*Assistant Examiner* — Armand Melendez
(74) *Attorney, Agent, or Firm* — Loza & Loza, LLP; Heidi L. Eisenhut

(57) ABSTRACT

The present invention provides an apparatus for manufacturing artificial marble including a granite soil storage unit for supplying a granite soil; a granite soil heating unit for heating the soil; a resin storage unit for storing a thermoplastic polyurethane (TPU) resin; a mixing-transporting unit for accommodating the resin and the heated granite soil therein and melting and mixing them to produce and simultaneously transport an artificial marble slurry; a material guide unit for guiding the soil and the resin into the mixing-transporting unit; a discharge unit for discharging the slurry; a mold supply unit for continuously supplying a mold for accommodating and molding the slurry; a mold guide unit for guiding the mold to accommodate the slurry; a forming unit for forming an artificial marble by applying vibration and pressure to the slurry; an extraction unit for extracting the mold; and a lamination unit for laminating and storing the mold extracted.

10 Claims, 14 Drawing Sheets

(51) Int. Cl.
    *C04B 26/18*     (2006.01)
    *C04B 24/16*     (2006.01)
    *C04B 14/04*     (2006.01)
    *B28B 1/00*     (2006.01)
    *B29C 67/24*     (2006.01)

(52) U.S. Cl.
    CPC .............. *C04B 14/04* (2013.01); *C04B 24/16* (2013.01); *C04B 2111/542* (2013.01)

(56) References Cited

U.S. PATENT DOCUMENTS

| | | | | |
|---|---|---|---|---|
| 9,613,412 | B1* | 4/2017 | Olson | G06F 16/51 |
| 9,707,698 | B1* | 7/2017 | Xie | B28C 7/02 |
| 10,662,121 | B1* | 5/2020 | D'Avela | B28C 5/00 |
| 2003/0122273 | A1* | 7/2003 | Fifield | B29C 67/243 |
| | | | | 264/109 |
| 2004/0119191 | A1 | 6/2004 | Kwon et al. | |
| 2008/0079185 | A1* | 4/2008 | Jamrussamee | B28B 7/46 |
| | | | | 264/86 |
| 2008/0116617 | A1* | 5/2008 | Toncelli | B29C 67/244 |
| | | | | 264/444 |
| 2009/0105391 | A1 | 4/2009 | Buskila et al. | |

FOREIGN PATENT DOCUMENTS

| | | |
|---|---|---|
| KR | 1999-0061711 A | 7/1999 |
| KR | 2004-0056647 A | 7/2004 |
| KR | 100642301 B1 | 10/2006 |
| KR | 20110091610 A | 8/2011 |
| KR | 20110093485 A | 8/2011 |
| KR | 2012-0006178 A | 1/2012 |
| KR | 10-1191092 B1 | 10/2012 |
| KR | 10-1241777 B1 | 3/2013 |
| KR | 101299662 B1 | 9/2013 |
| KR | 20160036295 A | 4/2016 |

* cited by examiner

US 10,858,288 B2

ARTIFICIAL MARBLE PRODUCTION DEVICE AND ARTIFICIAL MARBLE PRODUCED USING SAME

CROSS-REFERENCE TO RELATED APPLICATIONS

This application is the U.S. national stage of International Patent Application No. PCT/KR2017/006502, filed on Jun. 21, 2017, which claims the benefit of priority from the Republic of Korea Patent Application No. 10-2016-0114269, filed Sep. 6, 2016. The disclosures of the foregoing applications are incorporated herein by reference in their entirety.

TECHNICAL FIELD

The present invention relates to an apparatus for manufacturing artificial marble and an artificial marble manufactured using the same, and more particularly, to an apparatus for manufacturing artificial marble, capable of continuously forming an artificial marble by independently heating a granite soil and then mixing the heated granite soil with a thermoplastic polyurethane (TPU) resin, and an artificial marble manufactured using the same.

BACKGROUND ART

In general, there are different types of building stones, for example, bricks, blocks, tiles, marble, and granite. Here, concrete products such as bricks or blocks are universally used since they are easy and economical in processing.

However, these products are used merely as fundamental materials and are limited for building walls pursuing design values and stiffness, due to rough surfaces and weak strength.

Meanwhile, marble, granite, and the like, which are natural stones, are well used as materials for forming building walls since they have an excellent design value according to the texture. However, there is a limit in quarrying these natural stones due to depletion of natural resources and destruction of ecosystems, and for this reason, there is always a possibility of causing a problem related to supply of raw materials.

Natural stone should be relatively thick, taking into account the safety of constructed buildings and the safety of processed natural stone, which leads to an increase in cost. In addition, since it may be difficult or impossible to process the natural stone and the shape and quality of the natural stone depend on the circumstances of producing districts, there are many limitations in designing and constructing buildings.

Above all things, it is difficult to generally use this natural stone which price is expensive. Besides, stones which are discharged due to removal or replacement and damage of buildings are discarded or left untreated, which brings about environmental pollution and senseless waste of available resources.

Accordingly, many techniques for manufacturing artificial stone have been developed and used in recent years.

Artificial marble is generally manufactured by mixing an acrylic polymer resin with a large amount of powdered mineral fillers, marble chips, various kinds of additives, curing initiators, pigments, etc. to produce a slurry-phase mixture, pouring the mixture into a mold or the like, curing the poured mixture in an appropriate curing device to produce a sheet-shaped semi-finished product, and then processing the semi-finished product through edge trimming and surface polishing. This artificial marble is an imperforate material with identical surface and interior, and may be easily cut, polished, bent with heat, and bonded with adhesive while being strong. Thus, the artificial marble is in increasing demand as building interior materials such as upper sinks for kitchen, various kinds of counters, washstands, and wall materials.

For example, Korean Patent Application Publication No. 1999-0061711 discloses an apparatus for am acryl based artificial marble plate continuously by using a hardening apparatus, capable of curing a product by adjusting the width thereof using only a set of steel belts.

However, the raw material mixture injected into the apparatus is produced by mixing 100 parts by weight of acrylic resin syrup with 110 to 300 parts by weight of mineral filler, a small amount of dispersing agent, a cross-linking agent, a photostabilizer, and a pigment in a stirring mixer, and deaerating it under vacuum.

Korean Patent Application Publication No. 10-2012-0006178 discloses an apparatus for manufacturing artificial stone for construction, capable of manufacturing an artificial stone by adding a hardener, teabag powder, a dye, and water to a primary mixture which is obtained by mixing magnesia cement, anhydrous gypsum, limestone, and snowflake stone to produce a secondary mixture, and then forming and curing the secondary mixture.

Korean Patent Application Publication No. 10-2011-0091610 discloses a system for manufacturing artificial-stone interior/exterior sheets, capable of continuously manufacturing an interior/exterior sheet in the form of artificial stone using cement mortar as a main material without a mold.

Korean Patent No. 10-1241777 discloses an inorganic artificial marble and a composition for inorganic artificial marble.

This is a technique for producing artificial marble slurry by mixing 10 parts by weight of inorganic powder, which is obtained by baking kaolin and brushite in a 350-furnace and collecting and pulverizing it, with 90 parts by weight of a quartz-silica chip, and injecting 30 parts by weight of an acid activator of pH 1 thereinto.

The acid activator is adapted to have a pH of 1 by producing an aqueous solution such that the solid content of sodium silicate and potassium silicate is 55 parts by weight, and adding hydrochloric acid thereto.

Korean Patent Application Publication No. 10-2004-0056647 discloses a method for continuously producing artificial marble and an apparatus using the same, capable of continuously manufacturing an artificial marble such that curing reactant is not bent by a heating mean provided to heat the upper and lower surface of a raw material mixture at the same temperature.

That is, this is a technique for producing a raw material mixture by mixing unsaturated ester resin, acrylate resin, or methacrylate resin as a thermoplastic resin, aluminum hydroxide, silicate, or magnesium oxide as a filler, a peroxide or perester compound as a reaction initiator, and an acrylate compound as a cross-linking agent.

The above techniques are not preferred for safety in that since the components harmful to human bodies, such as hardeners, reaction initiators, and cross-linking agents, are contained in the product manufactured thereby, their release increases rapidly particularly when the temperature rises.

In addition, the thermoplastic resin may not be recycled when it is used as a binder, and the solvent added to increase fluidity during molding also causes environmental hormones and toxic substances. Hence, it may adversely affect the health of children or elderly people with low level of immunity.

In addition, it is difficult to apply the products manufactured by the conventional techniques to a flooring material since the product has low durability and does not have elasticity and permeable functions due to high hardness.

For example, desertification is accelerated due to forest destruction, wrong urbanization, or the like in modern times and rainwater is artificially drained through drainage channels in cities, which leads to severe destruction of climatic environment. Therefore, road pavement must be performed using a flooring material with permeability for recovery of water circulation around the city.

However, since the products manufactured by the conventional techniques do not have permeable functions and has low shock-absorbing power, it is impossible to apply the products to a flooring material or the like for walking or it is difficult to change the use of the products in various ways.

In order to resolve these problems, Korean Patent No. 10-1191092 discloses a permeable block using high molecular polymer, which has improved strength and elasticity and permeability by using a high molecular polymer instead of a cement mixture.

In more detail, the high molecular polymer is produced by mixing a polymethyl methacrylate (PMMA) or urethane-acrylate resin and a polymerization initiator, and the polymerization initiator is a necessary component that cures the PMMA or urethane-acrylate resin by polymerization therewith.

Accordingly, there is a problem in that the permeable block necessarily requires the polymerization initiator which is harmful to human bodies and brings about serious environmental pollution because it is difficult to recycle the permeable block after being cured.

Moreover, in the conventional techniques, there is no artificial marble manufactured by adopting a thermoplastic polyurethane (TPU) resin, which is harmless to human bodies, has elastic force, and is in a solid phase at room temperature. In addition, they disclose only a continuous forming process while the product has a permeable function, without suggesting a specific embodiment for how different materials are mixed in the apparatus for manufacturing the same. For this reason, it is difficult to check whether or not permeability performance is implemented in practice.

CITATION LIST

Korean Patent Application Publication No. 1999-0061711
Korean Patent Application Publication No. 10-2012-0006178
Korean Patent Application Publication No. 10-2011-0091610
Korean Patent No. 10-1241777
Korean Patent Application Publication No. 10-2004-0056647
Korean Patent No. 10-1191092

SUMMARY OF INVENTION

Technical Problem

The present invention has been made in view of the above-mentioned problems, and an object thereof is to provide an apparatus for manufacturing artificial marble, capable of continuously forming an artificial marble in the form of a sheet by independently heating a granite soil and then mixing the heated granite soil with a thermoplastic polyurethane (TPU) resin, and an artificial marble manufactured using the same.

Another object of the present invention is to provide an apparatus for manufacturing artificial marble, capable of continuously forming a sheet-shaped artificial marble having high safety since it does not cause environmental hormones and toxic substances, and simultaneously having elasticity and drainage capability by using a thermoplastic polyurethane (TPU; CAS No. 75701-44-9) resin as a binding material, which is a solid-phase elastic body at room temperature, without using a thermosetting polyurethane (PU) resin produced by mixing a solvent with cement mixed with water used as a conventional binding material, an acrylic, unsaturated polyester, or epoxy binder, or a polyurethane (PU; CAS No. 9009-54-5) material, which is in a liquid phase at room temperature, as a binding material, and by securing a flow behavior required for mixing by applying heat to the pure thermoplastic polyurethane resin, unlike a conventional binding material which requires a reaction initiator, a hardener, or a solvent to secure a flow behavior, thereby enabling to continuously manufacture the artificial marble to be used in various manners for interior/exterior materials for building or artificial stone for permeable flooring materials, and an artificial marble manufactured using the same.

A still another object of the present invention is to provide an apparatus for manufacturing artificial marble, capable of continuously forming a sheet-shaped artificial marble having a beautiful appearance and suppressing generation of radiant heat, and an artificial marble manufactured using the same. Here, when mixing a TPU resin as thermo plastics with a granite soil as aggregate with weak strength, it does not use a screw extrusion technique for applying a high temperature and a strong shearing force to a material to extrude the material at high pressure by melting and mixing, which is a conventional technique universally used when processing thermo plastics. Accordingly, the present invention accommodates the heated granite soil and the thermoplastic polyurethane resin together, and melts and mixes them through rolling by the self-weight of the accommodated material to produce an artificial marble slurry, and at the same time, continuously transports the artificial marble slurry, which is in a high-viscosity fluid state causing consumption of large amount of energy in a separate transport process, to simplify a handling process and minimize an external force applied to the granite soil, through the application of a mixing-transporting technique capable of minimizing the damage and abrasion of the granite soil. In addition, by washing the granite soil to remove fine powder from the surface thereof, the porous rough surface of a granite soil particle serves as a hook, and the TPU resin serving as a rope is strongly bonded to the surface of the granite soil particle. It is also possible to increase penetration of the TPU resin by expansion of fine pores of the heated granite soil. Thus, it is possible to expect high durability in molding completion and increase sound absorption/vibration absorption and thermal insulation effects by forming pores between adjacent granite soils, leading to reduced manufacturing costs by using the granite soil, which is cheap because of low availability due to weak strength and is easily supplied, as a main material, and to maintain the intrinsic color and texture of the natural granite soil.

A further object of the present invention is to provide an apparatus for manufacturing artificial marble, capable of continuously forming a recyclable artificial marble in the form of a sheet by inserting a broken artificial marble together when mixing a thermoplastic polyurethane resin and a granite soil, in such a way to adopt the TPU resin, make the curing time of an artificial marble slurry slow using the characteristic of thermoplastic resin, which the curing time of melting by heat and then cooling is much slower compared to other thermo plastics, and thermal energy accumulated in the independently heated granite soil so as to secure the time required to maintain a molten state necessary for sufficient bonding as needed for processing, and to manufacture the artificial marble using only the thermoplastic polyurethane resin and the granite soil without using other additives, and an artificial marble manufactured using the same.

Solution to Problem

An apparatus for manufacturing artificial marble according to an aspect of the present invention includes a granite soil storage unit configured to supply a granite soil by storing, drying, and heating it, a granite soil heating unit configured to heat the granite soil supplied from the granite soil storage unit, a resin storage unit configured to store a thermoplastic polyurethane (TPU) resin maintained in a solid phase at room temperature, a mixing-transporting unit configured to accommodate the TPU resin and the heated granite soil therein and then melting and mixing them to produce and simultaneously transport an artificial marble slurry, a material guide unit configured to guide the granite soil and the TPU resin into the mixing-transporting unit, a discharge unit configured to discharge the artificial marble slurry mixed in the mixing-transporting unit by a certain amount, a mold supply unit configured to continuously supply a mold for accommodating and molding the artificial marble slurry therein, a mold guide unit configured to guide the mold supplied from the mold supply unit downward of the discharge unit to accommodate the artificial marble slurry in the mold, a forming unit configured to form an artificial marble by applying vibration and pressure to the artificial marble slurry accommodated in the mold, an extraction unit configured to extract the mold accommodating the artificial marble, and a lamination unit configured to laminate and store the mold extracted by the extraction unit.

The granite soil storage unit may have a dehumidification function for removing water from the granite soil.

The granite soil heating unit may include a low temperature portion having a heating temperature of 100 to 300° C., an intermediate temperature portion having a heating temperature of 150 to 350° C., and a high temperature portion having a heating temperature of 200 to 400° C., and the granite soil may be gradually heated to a temperature of 150 to 250° C.

The mixing-transporting unit may form the artificial marble slurry by melting and mixing the granite soil and the TPU resin through rolling by self-weight, thereby minimizing damage and abrasion of the granite soil.

The material guide unit may include a granite soil flow pipe for guiding the granite soil into the mixing-transporting unit, and a resin flow pipe for guiding the TPU resin into the mixing-transporting unit in a state in which it is partitioned from the granite soil flow pipe.

The discharge unit may be narrowed in internal size toward its lower portion to collect the artificial marble slurry supplied from the mixing-transporting unit by a certain amount and then continuously discharge it by self-weight, and a pressure of 0.1 to 1 kgf/cm$^2$ may be applied to the artificial marble slurry during discharge.

The mold guide unit may move the artificial marble slurry, which is discharged from the discharge unit, at a downward angle of 20 to 35° to guide it into the mold.

The mold guide unit may have a temporary-forming part provided at one side thereof to pressurize and form the artificial marble slurry that is discharged from the discharge unit and accommodated in the mold.

The forming unit may laminate a plurality of molds accommodating the artificial marble slurry to apply a load of 0.1 kgf/cm$^2$ to 1 kgf/cm$^2$ to a mold located at the lowermost position while providing vibration to the mold, the extraction unit may extract the mold located at the lowermost position, and a mold laminated at the uppermost position may be extracted by the extraction unit in a state in which the artificial marble is completed after 5 to 20 minutes.

The extraction unit may extract the mold located at the lowermost position.

The forming unit may include a lamination space that is open at a portion of a side surface thereof and its upper portion for lamination of the plurality of molds, a lifter configured to rectilinearly reciprocate in a vertical direction outside the lamination space, a load removal part extended and reduced in a direction of the molds and coupled to one side of the lifter to remove a load applied to the lowermost mold by vertical interlocking, a pedestal supporting the molds transported by the loader to laminate the molds in the lamination space, and a vibration generator for providing vibration to the molds.

The lamination unit may accommodate a rack for laminating the plurality of molds, and the rack may be moved up and down by an elevation device.

A rack supply unit may be provided in the vicinity of the mold supply unit to supply the rack accommodating therein the plurality of molds from which the artificial marble is separated into the mold supply unit.

In the artificial marble according to the present invention, the TPU resin may be coated on an outer surface of the granite soil, and the granite soil and a granite soil adjacent thereto may be spaced apart from each other to form a pore.

The granite soil may be protected by the TPU resin when an external force is applied thereto, and the TPU resin may generate an elastic force.

Advantageous Effects of Invention

According to the present invention, it is possible to continuously form and manufacture an artificial marble in the form of a sheet by independently heating a granite soil and then mixing the heated granite soil with a thermoplastic polyurethane (TPU) resin.

Thus, it is possible to reduce costs and produce the artificial marble in quantity.

Since the TPU resin, which is a solid-phase elastic body at room temperature, is used as a binding material in the present invention, it is possible to secure a flow behavior required for mixing by applying heat to the pure TPU resin, unlike a conventional binding material which requires a reaction initiator, a hardener, or a solvent to secure a flow behavior. Therefore, the artificial marble can have high safety since it does not cause environmental hormones and toxic substances, and simultaneously have elasticity and drainage capability. Consequently, the artificial marble can be used in various manners for interior/exterior materials for building or artificial stone for permeable flooring materials.

In the case of mixing the TPU resin with the granite soil, it is possible to produce an artificial marble slurry by melting and mixing through rolling by the self-weight of the material, and at the same time to continuously transport the artificial marble slurry, which is in a high-viscosity fluid state causing consumption of large amount of energy in a separate transport process, to simplify a handling process and minimize an external force applied to the granite soil, through the application of the mixing-transporting technique capable of minimizing the damage and abrasion of the granite soil. In addition, since the porous rough surface of the granite soil particle serves as a hook by washing the granite soil to remove fine powder from the surface of the granite soil particle, and the TPU resin serving as a rope is strongly bonded to the surface of the granite soil particle, it is possible to increase penetration of the TPU resin by expansion of fine pores of the heated granite soil and to expect high durability in molding completion.

It is possible to increase sound absorption/vibration absorption and thermal insulation effects by forming pores between the adjacent granite soils, to reduce manufacturing costs by using the granite soil, which is cheap because of low availability due to weak strength and is easily supplied, as a main material, and to maintain the intrinsic color and texture of the natural granite soil. Therefore, it is possible to manufacture the artificial marble having a beautiful appearance and suppressing generation of radiant heat.

It is possible to manufacture a recyclable artificial marble by inserting a broken artificial marble together when mixing the TPU resin and the granite soil, in such a way to adopt the TPU resin, make the curing time of an artificial marble slurry slow using the characteristic of thermoplastic resin, which the curing time of melting by heat and then cooling is much slower compared to other thermo plastics, and thermal energy accumulated in the independently heated granite soil so as to secure the time required to maintain a molten state necessary for sufficient bonding as needed for processing, and to manufacture the artificial marble using only the TPU resin and the granite soil without using other additives.

DESCRIPTION OF EMBODIMENTS

Figure 1:
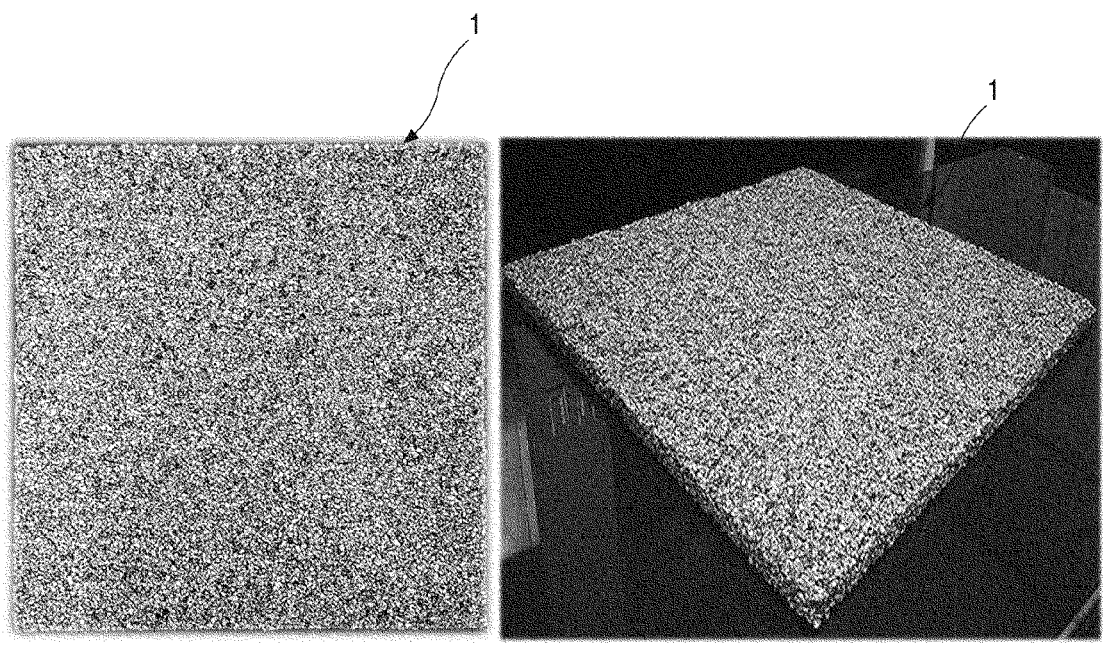
FIG. 1 is a photograph illustrating an external appearance of an artificial marble according to the present invention.

Hereinafter, the configuration of an artificial marble according to exemplary embodiments of the present invention will be described with reference to FIG. 1.

Prior to the description, it is noted that the terms and words used in the specification and claims should not be construed as being limited to common or dictionary meanings but instead should be understood to have meanings and concepts in agreement with the spirit of the present invention based on the principle that an inventor can define the concept of each term suitably in order to describe his/her own invention in the best way possible.

Accordingly, the embodiment described in the specification and the construction shown in the drawings are nothing but one preferred embodiment of the present invention, and it does not cover all the technical ideas of the invention. Therefore, it should be understood that various changes and modifications which can substitute for the embodiments may be made at the time of filing the present application.

FIG. 1 is a photograph illustrating an external appearance of an artificial marble according to the present invention.

As illustrated in the drawing, the artificial marble, which is designated by reference numeral 1, according to the present invention has an elastic force to absorb shocks applied from the outside and is formed to have a variety of sheet shapes.

The artificial marble 1 is configured to have permeability by pores formed therein.

To this end, the artificial marble 1 includes a granite soil and a thermoplastic polyurethane (TPU) resin.

That is, the artificial marble 1 is formed using the granite soil (decomposed granite soil), which is formed by weathering of granite and granite gneiss which account for more than 55% of rock distributed in the country, and the TPU resin, which is a non-toxic material with no emission of harmful substances and has high water resistance, oil/chemical resistance, and weather resistance, and excellent mechanical properties, as a binding material.

The granite soil is limitedly used for building since it has weak strength while being easily supplied and being cheap, but the granite soil in the present invention is formed to have enhanced strength by coating the TPU resin on the outer surface of the granite soil and to have permeability by pores formed in such a way to bond the TPU resin coated on the outer surface of the granite soil.

The artificial marble 1 has coating adhesion secured by mixing and coating the washed granite soil, from which water is removed, with the TPU resin so that the TPU resin permeates to microcracks formed on the surface of the granite soil.

In more detail, the granite soil is used in the state in which fine powder is removed from the particles of the granite soil by washing, and is mixed with the TPU resin in the state in which it is gradationally heated to prevent cracks so that the surface pores of the granite soil are expanded.

Figure 2:
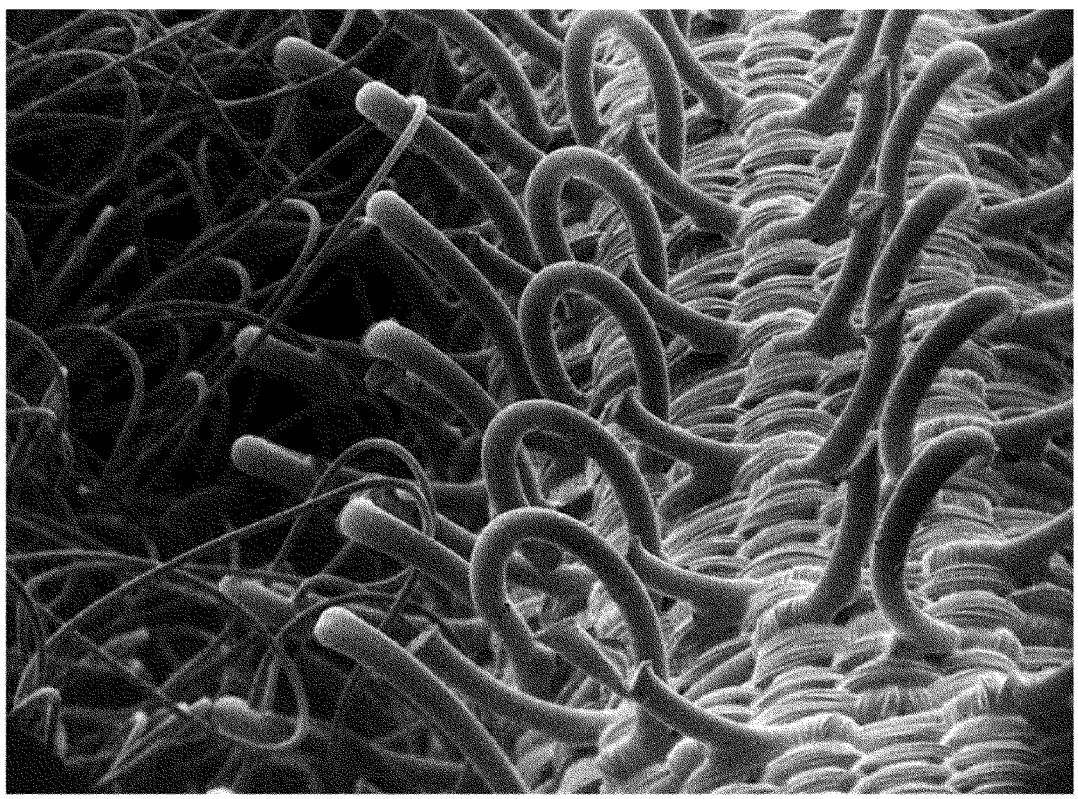
FIG. 2 is a schematic picture illustrating bonding action between granite soil and thermoplastic urethane resin which are main components of the artificial marble according to the present invention.

Accordingly, to increase a binding force, the TPU resin deeply permeates into the surface pores of the granite soil and the rough surface of the granite soil is bounded to the TPU resin in a manner that a rope is latched to a hook (see FIG. 2).

Hereinafter, a configuration of an apparatus for manufacturing artificial marble 100 to manufacture the artificial marble 1 will be described with reference to FIG. 3.

Figure 3:
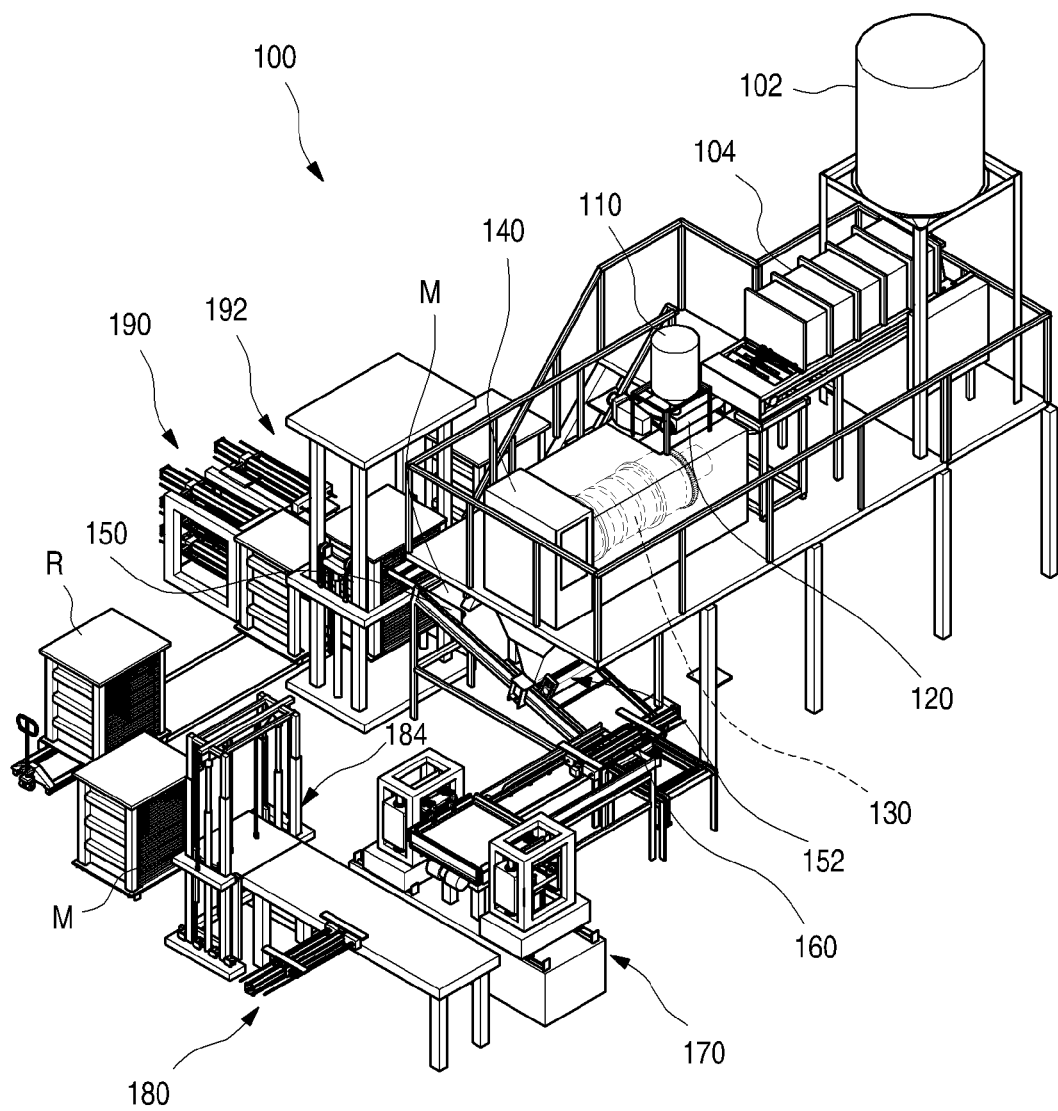
FIG. 3 is a perspective view illustrating a configuration of an apparatus for manufacturing artificial marble according to the present invention.

FIG. 3 is a perspective view illustrating the configuration of the apparatus for manufacturing artificial marble 100 according to the present invention.

The configuration of the apparatus for manufacturing artificial marble 100 will be described in sequence according to the manufacturing process in which granite soil and TPU resin move.

Figure 4:
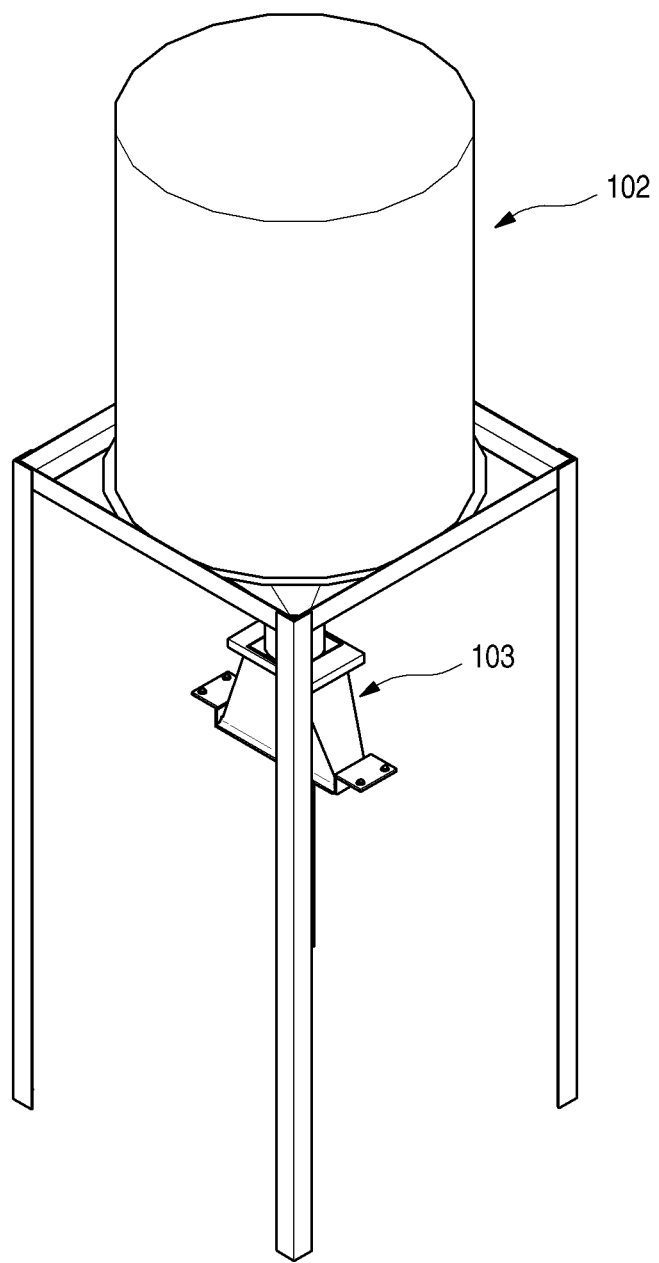
FIG. 4 is a perspective view illustrating a configuration of a granite soil storage unit which is one component in the apparatus for manufacturing artificial marble according to the present invention.

First, the apparatus for manufacturing artificial marble 100 includes a granite soil storage unit 102 that stores granite soil. The granite soil storage unit 102 accommodates a large amount of granite soil therein and discharges the granite soil downward as occasion demands. As illustrated in FIG. 4, the granite soil storage unit 102 has an opening portion 103 formed in the lower portion thereof to be selectively opened for discharging the granite soil stored therein in the downward direction.

The granite soil storage unit 102 has a hot-air blower provided therein to supply heat to the internal space of the granite soil storage unit and dry the granite soil, so that the hot-air blower performs dehumidification and heating functions.

The hot-air blower heats the granite soil at a temperature of 80 to 120° C. and dries it to have a moisture content of 1 to 3%.

A granite soil heating unit 104 is provided beneath the granite soil storage unit 102. The granite soil heating unit 104 heats the warm granite soil, from which water is removed, at high temperature while transporting the granite soil.

Figure 5:
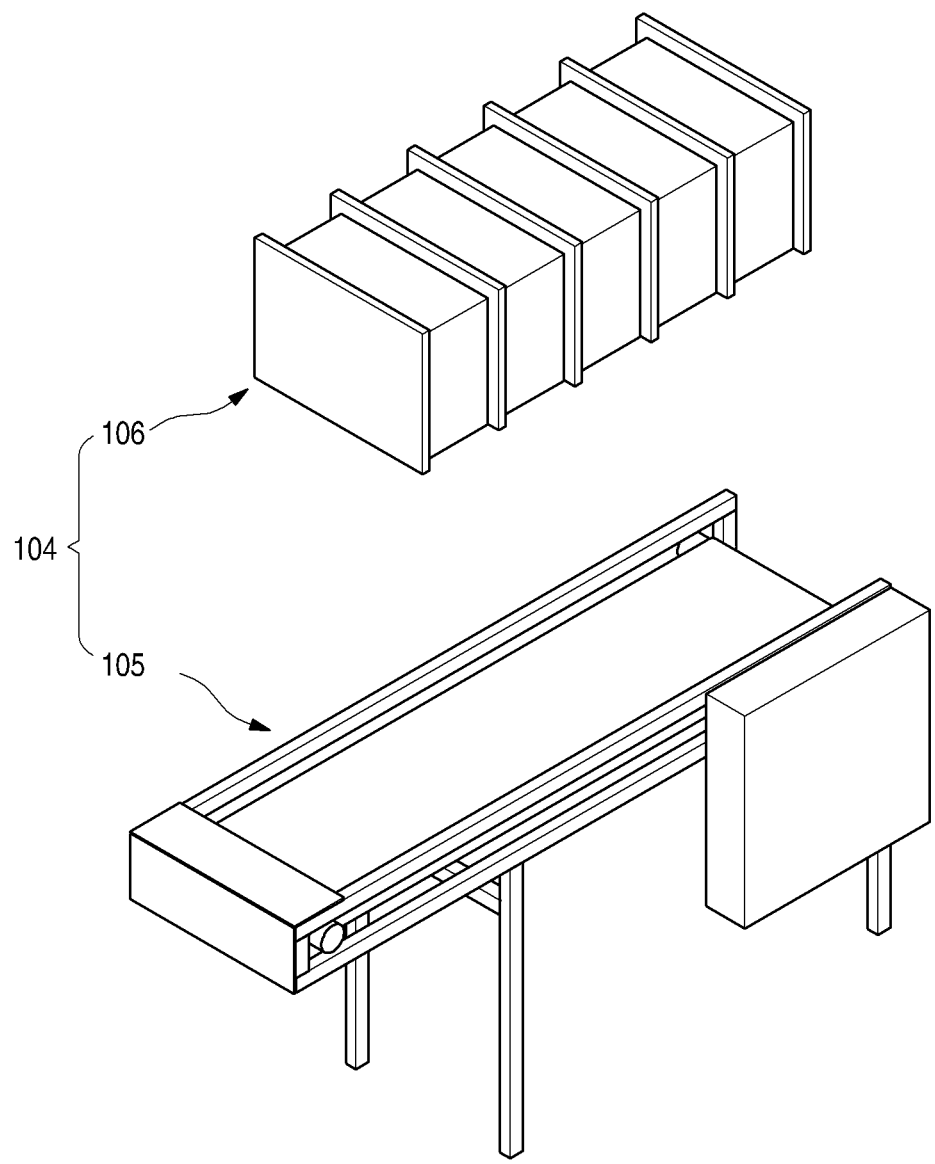
FIG. 5 is an exploded perspective view illustrating a configuration of a granite soil heating unit which is one component in the apparatus for manufacturing artificial marble according to the present invention.

The granite soil heating unit 104 will be described in more detail with reference to FIG. 5. The granite soil heating unit 104 includes a conveyor 105 and a heating furnace 106.

The conveyor 105 is of a track type to rotate at a constant speed, and transports the granite soil placed on the upper surface thereof. The heating furnace 106 generates heat in the inward direction to heat the granite soil transported by the conveyor 105. The heating furnace 106 gradually increases a heating temperature to prevent the damage of the granite soil due to rapid heating while the granite soil is transported by the conveyor 105.

That is, the heating furnace 106 is divided into a low temperature portion, an intermediate temperature portion, and a high temperature portion from the rear end thereof to the front end thereof, to gradually increase a heating temperature. In more detail, the low temperature portion heats the interior of the heating furnace 106 at a temperature of 100 to 300° C., the intermediate temperature portion heats it at a temperature of 150 to 350° C., and the high temperature portion heats it at a temperature of 200 to 400° C.

Thus, since the granite soil is gradually heated during transport along the conveyor 105, it is possible to previously prevent the damage or cracking of the granite soil due to rapid heating.

In an embodiment of the present invention, the conveyor 105 transports the granite sol at a speed of 5 to 20 kg/min and the heating furnace 106 generates heat so that the granite soil has a moisture content of 0.01 to 0.5% and a temperature of 180 to 250° C.

If the moisture content of the granite soil exceeds 0.5%, the granite soil may be cracked due to a reduction in adhesion even though it is coated with the TPU resin. Therefore, the granite soil is preferably controlled to have a moisture content equal to or less than 0.5%.

If the granite soil is heated at a temperature less than 180° C., it is difficult to mix the granite soil with the TPU resin. If the granite soil is heated at a temperature more than 250° C., the mechanical properties of the TPU resin may be damaged when the granite soil comes into contact with the TPU resin.

Thus, the granite soil is preferably controlled to be heated at a temperature of 180 to 250° C.

When the granite soil is heated at a temperature of 180 to 250° C., the granite soil expands in volume and the microcracks on its surface are expanded. The expanded microcracks allow the molten TPU resin to easily permeate into the granite soil, thereby enabling an increase in the binding force and strength of the granite soil and the TPU resin.

Figure 6:
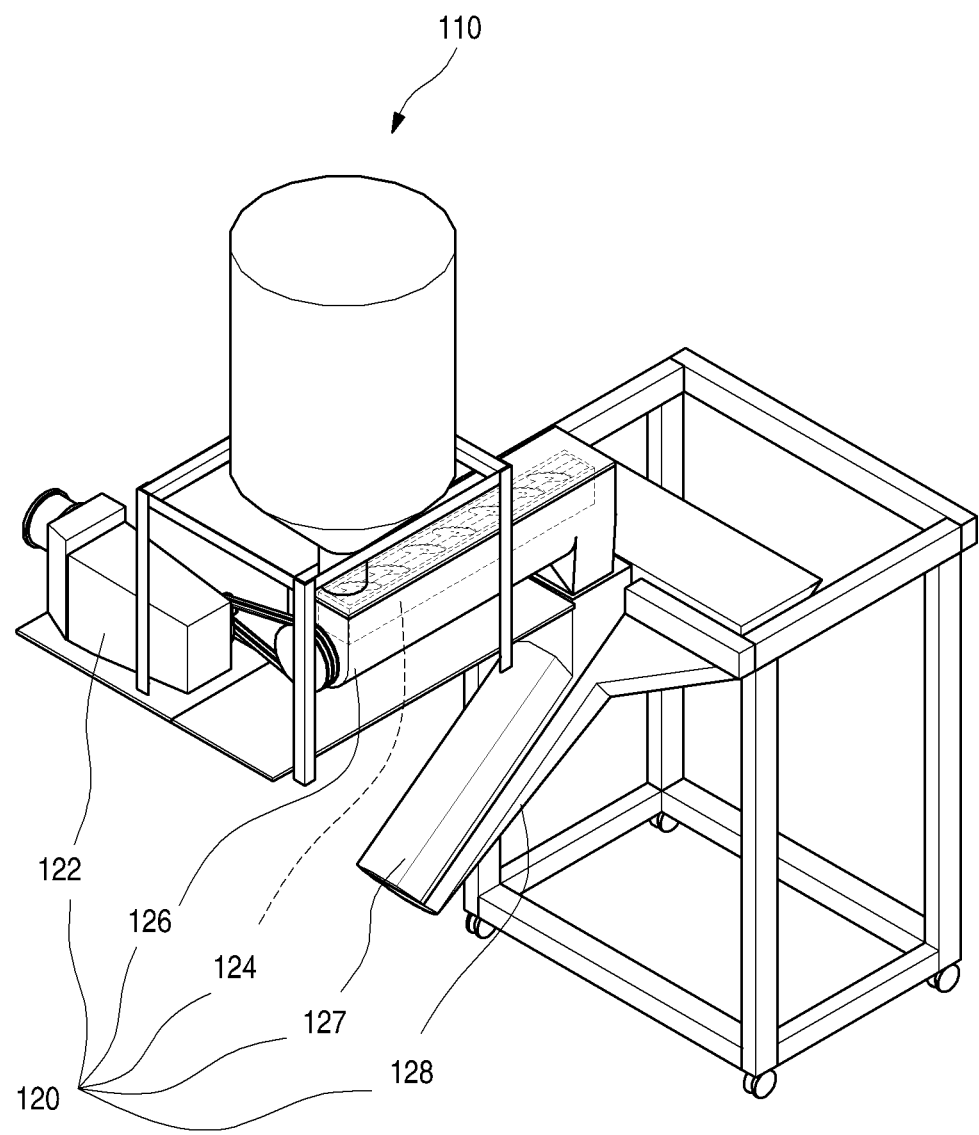
FIG. 6 is a perspective view illustrating the coupling between a resin storage unit and a material guide unit which are components in the apparatus for manufacturing artificial marble according to the present invention.

Referring to FIGS. 3 and 6, a resin storage unit 110 is provided in front of the granite soil heating unit 104. The resin storage unit 110 accommodates a TPU resin therein and discharges it downward as occasion demands.

The resin storage unit 110 includes a heating device or a drying device therein to control the TPU resin accommodated therein to have a moisture content of 0.01 to 0.5%.

A material guide unit 120 is installed beneath the resin storage unit 110. The material guide unit 120 guides the TPU resin flowing down from the resin storage unit 110 in the rearward direction when viewed in FIG. 6, and then forces its flow in the forward and downward direction again.

To this end, the material guide unit 120 is provided therein with a screw 124 that is rotated by rotational force received from a guide motor 122 to force the flow of the TPU resin in the rearward direction, and the outer periphery of the screw 124 is surrounded by a resin guide pipe 126.

Meanwhile, the rear end of the resin guide pipe 126 communicates with a resin flow pipe 127. The resin flow pipe 127 serves to accommodate the TPU resin, which forcibly flows rearward by the screw 124 and drops downward, and guides it forward and downward again.

A granite soil flow pipe 128 is provided beneath the resin flow pipe 127. The granite soil flow pipe 128 is partitioned from the resin flow pipe 127, and serves to guide the granite soil accommodated thereinto in the same direction as the flow direction of the resin.

Accordingly, the granite soil flow pipe 128 is largely open upward at the rear end thereof, and is placed to accommodate the granite soil dropping through the opening portion 103.

The granite soil and TPU resin guided forward, in the state in which they are separated from each other by the material guide unit 120, are inserted into a mixing-transporting unit 130. The detailed configuration of the mixing-transporting unit 130 the coupling relationship between the mixing-transporting unit 130 and the material guide unit 120 will be described with reference to FIGS. 7 and 8.

Figure 7:
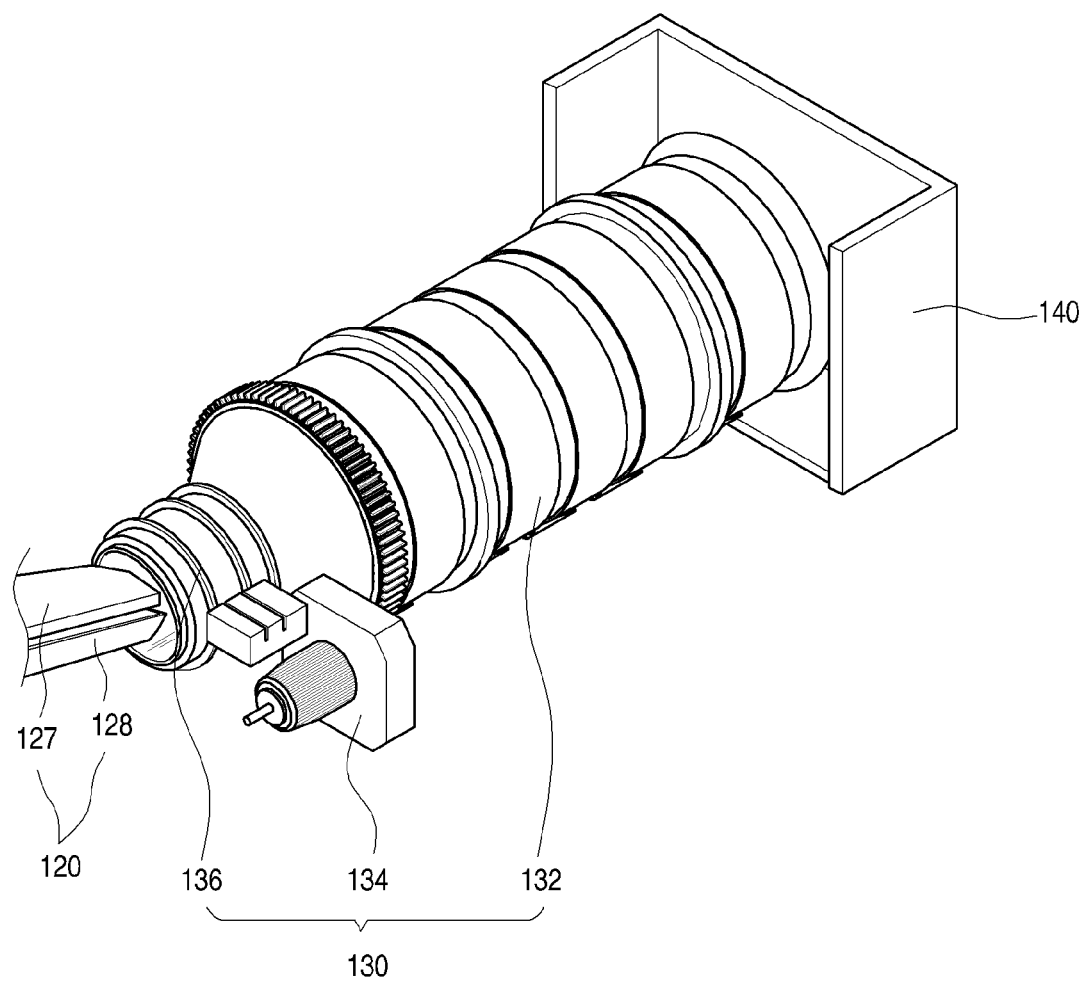
FIG. 7 is a perspective view illustrating an internal structure of a mixing-transporting unit which is one component in the apparatus for manufacturing artificial marble according to the present invention.
Figure 8:
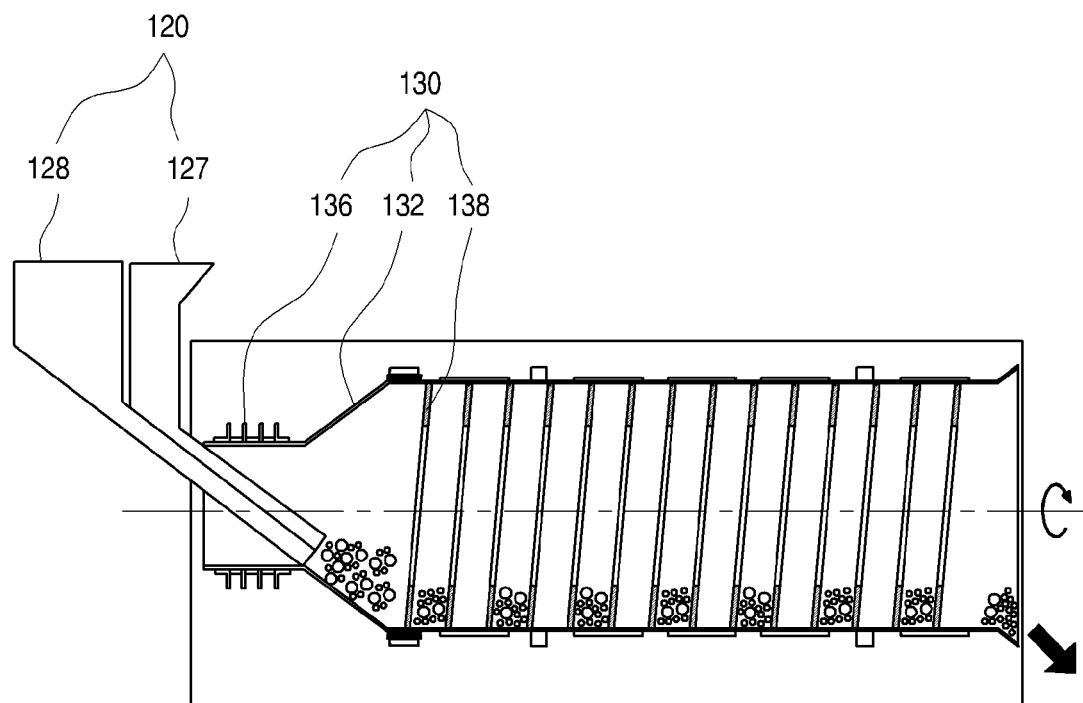
FIG. 8 is a schematic view illustrating arrangement and operation of the material guide unit and the mixing-transporting unit which are components in the apparatus for manufacturing artificial marble according to the present invention.

FIG. 7 is a perspective view illustrating the internal structure of the mixing-transporting unit 130 which is one component in the apparatus for manufacturing artificial marble 100 according to the present invention. FIG. 8 is a schematic view illustrating the arrangement and operation of the material guide unit 120 and the mixing-transporting unit 130 which are components in the apparatus for manufacturing artificial marble 100 according to the present invention.

As illustrated in the drawings, the ends of the resin flow pipe 127 and granite soil flow pipe 128 are inserted into a mixer 132, and the mixer 132 is rotated by a motor for mixing and transporting 134.

The mixer 132 has a predetermined space defined therein to be able to accommodate the granite soil and the TPU resin, and has a heating means 136 formed on the outer peripheral surface thereof to be able to mix and transport the granite soil and TPU resin accommodated therein while heating them.

In an embodiment of the present invention, the heating means 136 generates heat to increase the inner temperature of the mixer 132 to a temperature of 250 to 380° C.

The mixer 132 has a plurality of blades 138 formed therein, as illustrated in FIG. 8, to help to more efficiently mix the granite soil and the TPU resin.

That is, the blades 138 with a thin plate shape stands continuously in a spiral form on the inner peripheral surface of the mixer 132.

The mixer 132 rotates at a low speed such that an artificial marble slurry obtained by mixing the molten TPU resin and the granite soil is not moved upward by viscosity during rotation.

Accordingly, the artificial marble slurry is transported in a spiral direction in which the blades 138 are formed (in the right direction in FIG. 8) while rolling by self-weight along the separated space between the blades 138, more specifically between the blades 138 located on the bottom of the mixer 132.

This is to prevent the granite soil from dropping in the mixer 132 to minimize the abrasion and damage of the granite soil and efficiently mix the granite soil with the TPU resin, and to move the artificial marble slurry, which is in a high-viscosity fluid state causing consumption of large amount of energy in handling, to a next process for both of mixing and forming without having a separate transport process.

The mixer 132 is open at the rear thereof, and the artificial marble slurry mixed in the mixer 132 is discharged rearward and then collected in a discharge unit 140.

The discharge unit 140 is arranged behind the mixer 132. The discharge unit 140 serves to guide and discharge the collected artificial marble slurry, which is in a high-viscosity semisolid state causing consumption of large amount of energy in the process of collecting and handling the artificial marble slurry, by the self-weight thereof in the downward direction without using a separate extrusion device. The discharge unit 140 is narrowed in internal size toward the lower portion thereof, and serves to uniformly control an amount of the collected artificial marble slurry to maintain the discharge unit at a pressure of 0.1 to 1 kgf/cm$^2$.

A mold guide unit 150 is located beneath the discharge unit 140, as illustrated in FIG. 3.

Hereinafter, the detailed configuration of the mold guide unit 150 will be described with reference to FIG. 9.

Figure 9:
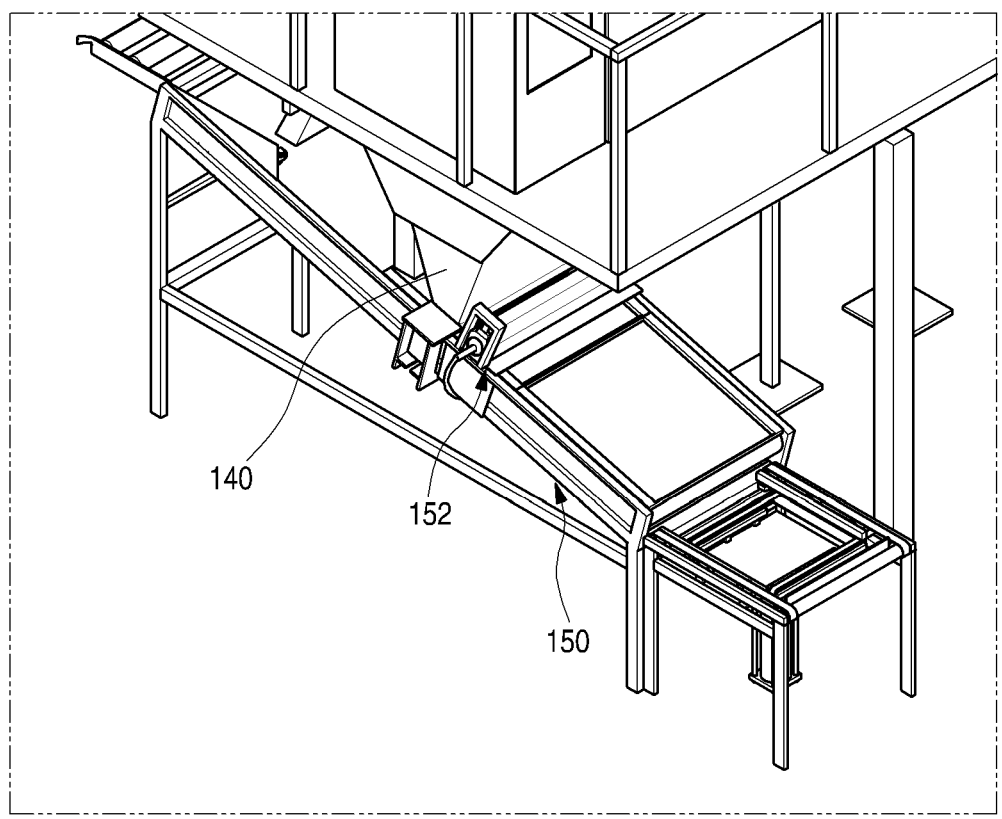
FIG. 9 is a perspective view illustrating arrangement of a discharge unit, a mold guide unit, and a temporary-forming part which are components in the apparatus for manufacturing artificial marble according to the present invention.

FIG. 9 is a perspective view illustrating the arrangement of the discharge unit 140, the mold guide unit 150, and a temporary-forming part 152 which are components in the apparatus for manufacturing artificial marble 100 according to the present invention.

As illustrated in the drawing, the mold guide unit 150 is inclined at an angle of 20 to 35° in order to obliquely transport a square plate-shaped mold M, the interior of which is open upward, in the right direction, and to apply the artificial marble slurry throughout the mold M in a uniform amount.

The mold guide unit 150 uses a conveyor belt applied thereto, and the discharge unit 140 is located above the central portion of the mold guide unit 150.

The temporary-forming part 152 is arranged to the right from the lower end of the discharge unit 140. The temporary-forming part 152 serves to uniformly compact the artificial marble slurry, which is accommodated in the mold M by dropping downward from the open lower end of the discharge unit 140, to have a certain height, and temporarily forms the artificial marble slurry in the form of a sheet by heating and pressing.

In an embodiment of the present invention, the temporary-forming part 152 is configured in the form of a roller having a built-in heater.

The artificial marble slurry, which is temporarily formed in the form of a sheet by the temporary-forming part 152 in the mold M, is transported forward by a loader (see reference numeral 160 in FIG. 3). The detailed configuration of the loader 160 will be described with reference to FIGS. 10 to 12.

Figure 10:
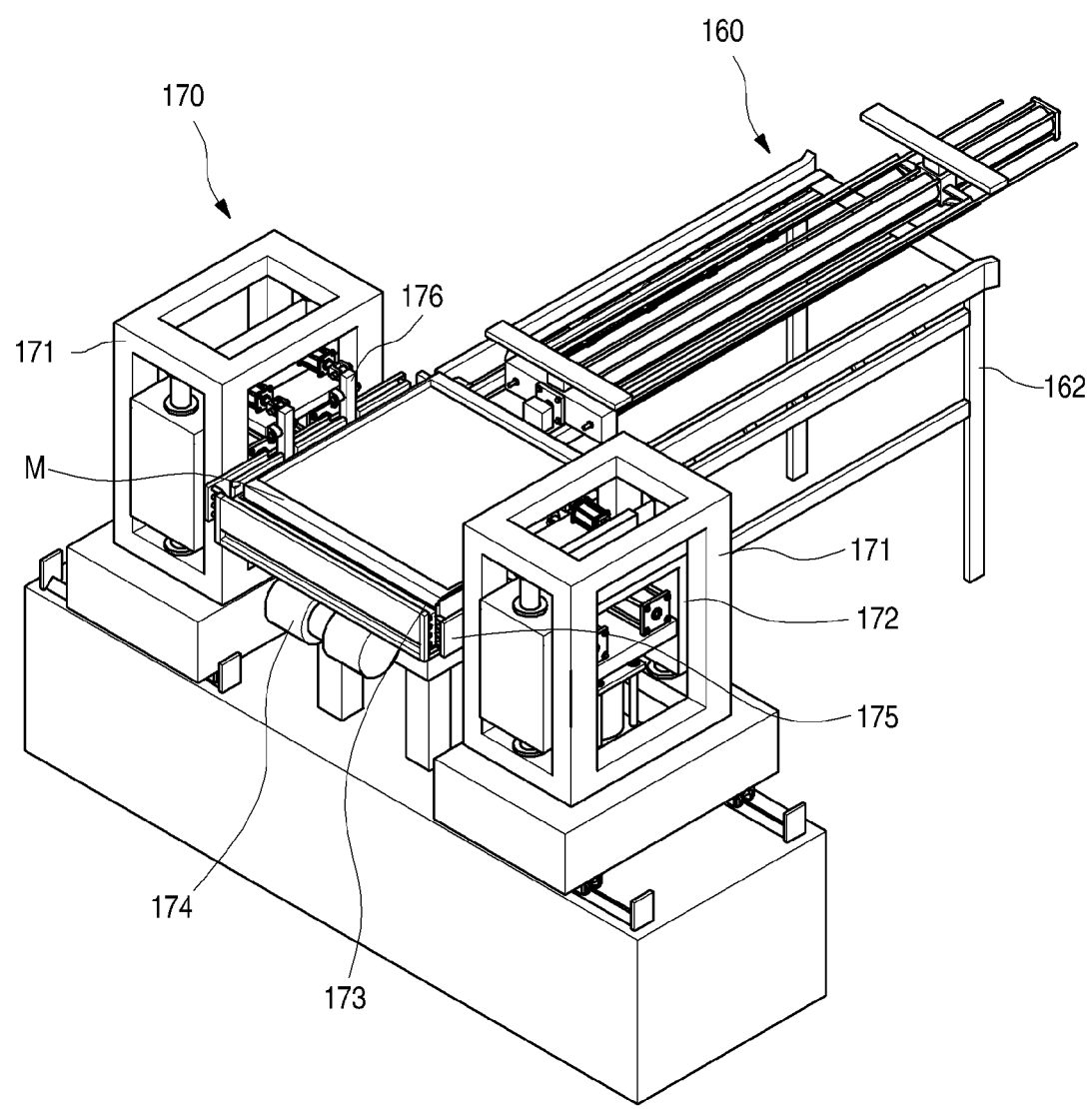
FIG. 10 is a perspective view illustrating arrangement of a loader and a forming unit which are components in the apparatus for manufacturing artificial marble according to the present invention.
Figure 11:
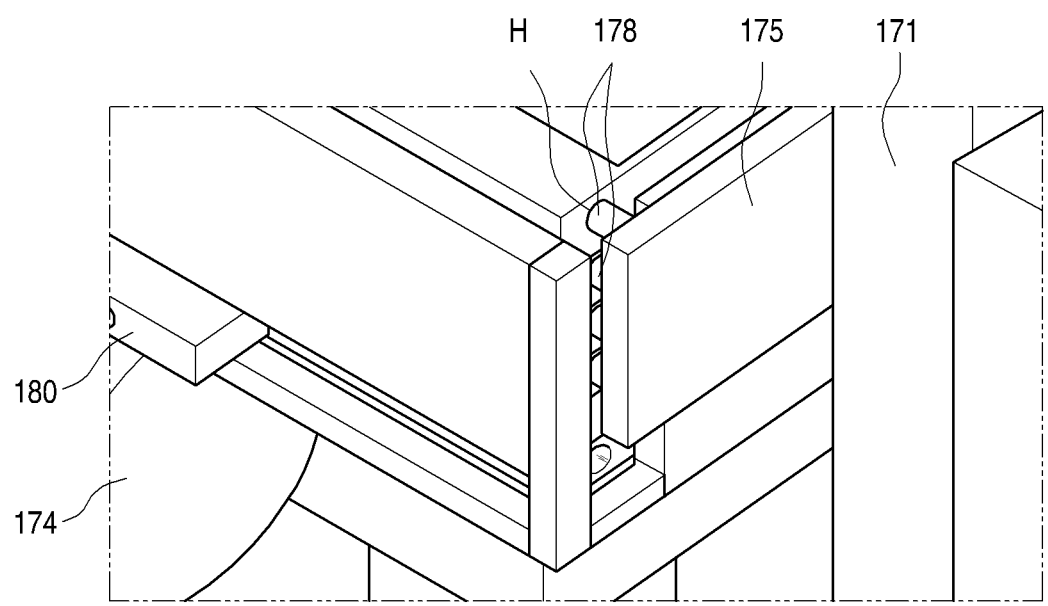
FIG. 11 is a partially enlarged perspective view illustrating the forming unit which is one component in the apparatus for manufacturing artificial marble according to the present invention.
Figure 12:
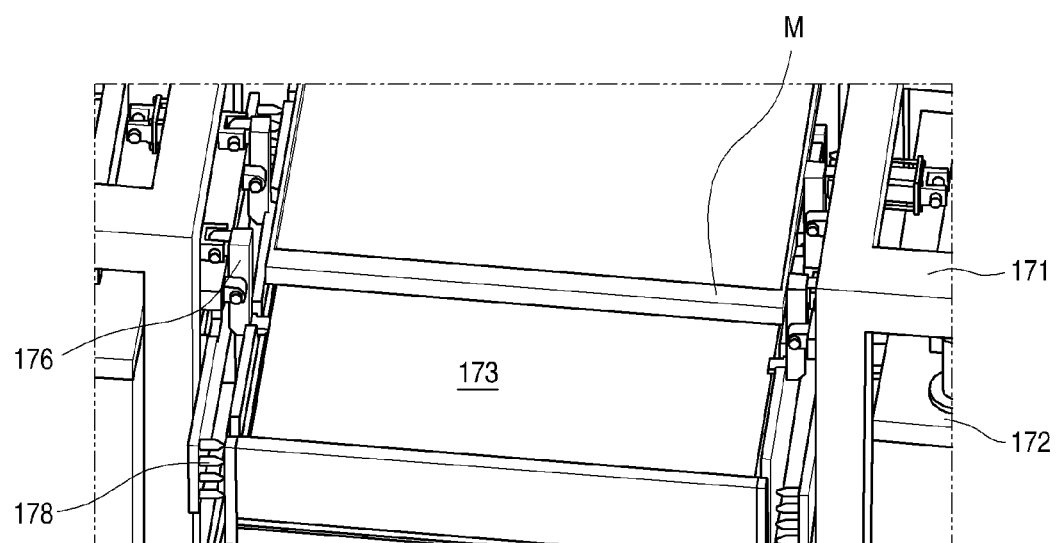
FIG. 12 is a perspective view illustrating operation of a pedestal of the forming unit which is one component in the apparatus for manufacturing artificial marble according to the present invention.

FIG. 10 is a perspective view illustrating arrangement of the loader 160 and a forming unit 170 which are components in the apparatus for manufacturing artificial marble 100 according to the present invention. FIG. 11 is a partially enlarged perspective view illustrating the forming unit 170 which is one component in the apparatus for manufacturing artificial marble 100 according to the present invention. FIG. 12 is a perspective view illustrating operation of a pedestal 176 of the forming unit 170 which is one component in the apparatus for manufacturing artificial marble 100 according to the present invention.

As illustrated in the drawings, the loader 160 rectilinearly reciprocates in the left and right direction to transport the mold M to the left direction, is fixed to a frame 162, and adopts a cylinder for extending and reducing its length.

The loader 160 rectilinearly moves in the state in which it supports the mold M thereon, to seat the mold M in the forming unit 170.

The forming unit 170 serves to form the temporarily-formed artificial marble slurry accommodated in the mold M once more and complete the artificial marble 1, and can increase a density of the artificial marble 1 by generating vibration and pressure at the same time.

The time required until the artificial marble slurry accommodated in the mold M is perfectly cured while the mold M is laminated on the forming unit 170 and moves down to the lowermost position, and is extracted after the completion of the molding is set as 5 to 20 minutes, taking into account characteristics of the TPU resin, which is classified in different types of grades, and the curing time of which significantly varies depending on the grade.

That is, after the artificial marble slurry in the mold M placed at the uppermost position of the forming unit 170 is cured while gradually moving down so that the artificial marble 1 is completed, the artificial marble is located at the lowermost position and then extracted to the outside by an extraction unit 180 after 5 to 20 minutes.

The forming unit 170 has support fixtures 171 formed to the left and right thereof while each is perforated therein in front and back, left and right, and up and down directions for installation of a plurality of parts therein. Each of the support fixtures 171 is maintained at a certain position, and has a lifter 172 moving up and down therein.

The lifter 172 moves up and down by extending and reducing in length of a cylinder installed at the lower side of the lifter in the support fixture 171.

A lamination space 173 is defined between the support fixtures 171. The lamination space 173 is a space for lamination of the mold M accommodating the artificial marble slurry, and is open at the lower and upper portions of the front surface thereof and at the edges at which the front surface thereof meets the left and right sides thereof.

Accordingly, when a plurality of molds M is laminated in the lamination space 173, the molds M are in a state as in FIG. 10, and the mold M located at the lowermost layer from among the molds M laminated in the lamination space 173 is exposed at the front thereof.

A vibration generator 174 is arranged in the lower portion of the lamination space 173. The vibration generator 174 serves to form the artificial marble slurry inserted into the mold M to have a high density. The plurality of molds M laminated in the lamination space 173 are simultaneously subjected to a load by self-weight as moving down, and it is therefore possible to improve a filling density together with the vibration generated by the vibration generator 174.

Meanwhile, a load removal part 175 is arranged between the pair of lifters 172. The load removal part 175 is configured such that the length thereof is extended and reduced in the direction facing the lifters 172. The end of the load removal part 175 is fitted to the mold M, thereby lifting a plurality of molds M when the lifters 172 move up.

That is, the load removal part 175 has a plurality of fitting protrusions 178 formed in the direction facing each other as in FIG. 11, and the mold M has insertion grooves H formed in the outer edge thereof.

The number of the fitting protrusions 178 is one less than the number of the laminated molds M.

This is to lift remaining molds M except for the mold M located at the lowermost layer up from among the laminated molds M. While the number of the fitting protrusions 178 is one less than the number of molds M, the fitting protrusion 178 located at the lowermost position from among the plurality of fitting protrusions 178 is designed to be inserted into the insertion groove H formed in the second mold M from the bottom.

Accordingly, when the lifters 172 are lifted up in the state in which the fitting protrusions 178 are inserted into the insertion grooves H, all of the plurality of molds M laminated in the lamination space 173 are lifted up, except for the mold M located at the lowermost layer.

Through such an operation, the mold M located at the lowermost layer can be extracted by the extraction unit 180 as illustrated in FIG. 11.

Meanwhile, the pedestal 176 is further provided between the pair of lifters 172 as illustrated in FIG. 12. The pedestal 176 is a component for seating the mold M transported by the loader 160 with safety through the upper portion of the lamination space 173.

That is, the pedestal 176 reciprocates and rotates by interlocking with the cylinder, the length of which is extended and reduced, in the state in which it is coupled to the lifters 172, and supports the mold M by operating such that the lower end of the pedestal is placed in the upper or outer side of the lamination space 173.

In more detail, when the mold M enters in the upper side of the lamination space 173 by the loader 160 in the state in which the lower end of the pedestal 176 is located in the upper side of the lamination space, the lower end of the pedestal 176 is maintained in the state in which it is located in the internal side of the lamination space 173 to support the lower surface of the mold M in the upward direction.

Accordingly, the pedestal 176 can prevent the mold M from dropping, and may seat the mold M supported by the interaction with the lifters 172 in the uppermost side of the lamination space 173.

Hereinafter, the detailed configuration of the extraction unit 180 will be described with reference to FIG. 13.

Figure 13:
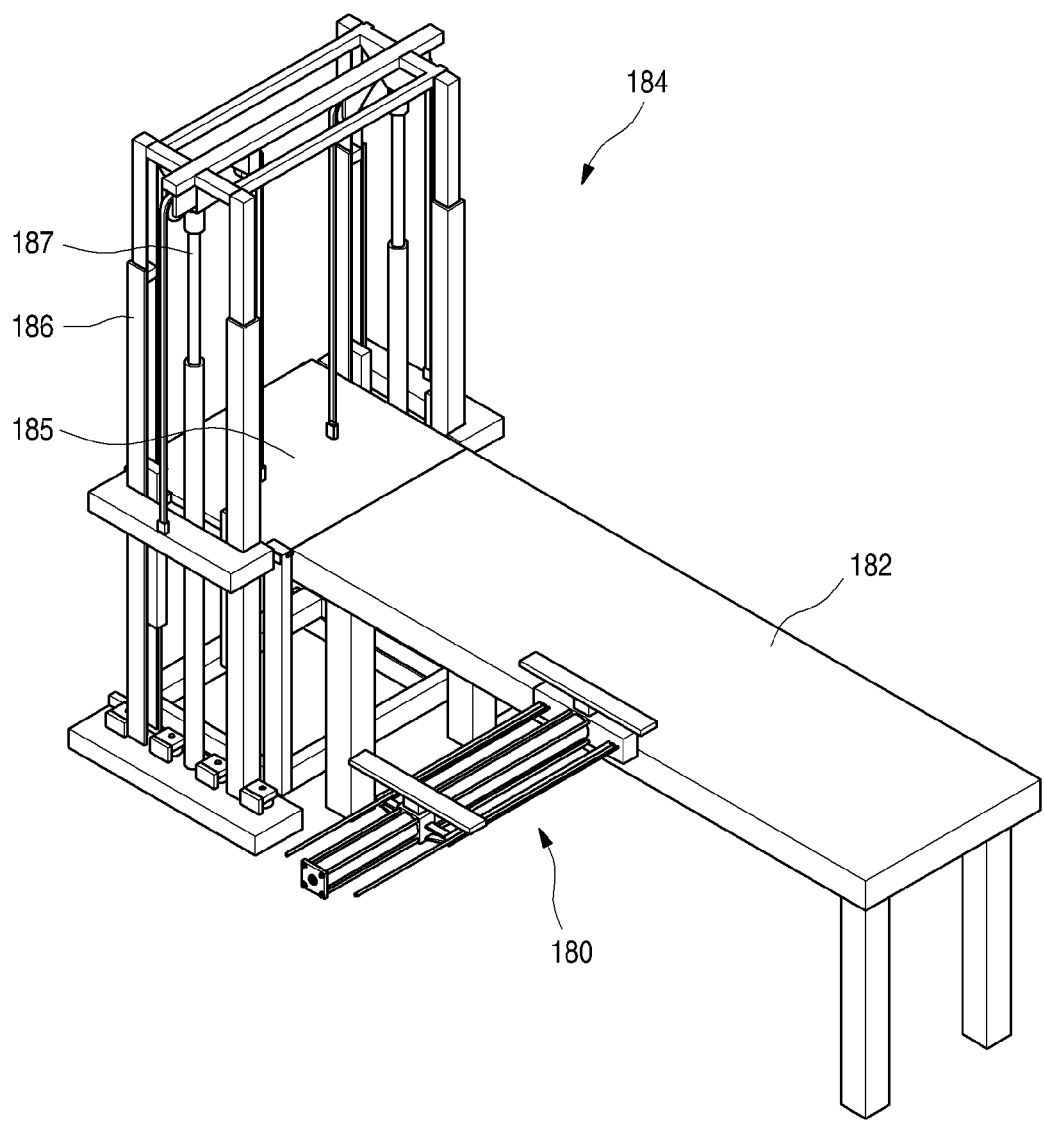
FIG. 13 is a perspective view illustrating arrangement of a lamination unit and an extraction unit which are components in the apparatus for manufacturing artificial marble according to the present invention.

FIG. 13 is a perspective view illustrating the arrangement of a lamination unit 184 and the extraction unit 180 which are components in the apparatus for manufacturing artificial marble 100 according to the present invention.

As illustrated in the drawing, the extraction unit 180 extracts the plurality of molds M laminated in the lamination space 173 to the outside of the lamination space 173. In an embodiment of the present invention, the extraction unit 180 adopts a cylinder and extracts the mold M by grasping force generated when the length of the cylinder is extended.

The extraction unit 180 includes a mold cabinet 182 formed in the rear thereof to temporarily laminate and store the plurality of molds M extracted from the lamination space 173. The mold cabinet 182 may temporarily store the plurality of layered molds M and then transport them to the left direction, and may force the transportation of the molds M by adopting a conveyor belt.

The lamination unit 184 is provided at the left end of the mold cabinet 182. The lamination unit 184 may accommodate the molds M, which are extracted from the lamination space 173 by the extraction unit 180, in a laminated state in a rack (see reference numeral R in FIG. 3).

The configuration of the lamination unit 184 will be described in detail. The lamination unit 184 includes a rack accommodation part 185 that accommodates a rack R, a support frame 186 that accommodates the rack accommodation part 185 to support a load, and an elevation member 187 that is extended and reduced in the height direction of the support frame 186 and is coupled to the lower end of the rack accommodation part 185 to move up and down the rack accommodation part 185.

Accordingly, when the length of the elevation member 187 is reduced in the state as in FIG. 13, the rack accommodation part 185 moves up and the rack R accommodated in the rack accommodation part 185 is also lifted up, thereby enabling the mold M transported to the left along the mold cabinet 182 to be accommodated in the rack R.

In contrast, when the length of the elevation member 187 is extended, the rack accommodation part 185 moves down and the rack R accommodated in the rack accommodation part 185 may be extracted to the left together with the mold M as illustrated in FIG. 3.

Meanwhile, the apparatus for manufacturing artificial marble 100 includes a rack supply unit (see reference numeral 190 in FIG. 3). The detailed configuration of the rack supply unit 190 will be described with reference to FIG. 14.

Figure 14:
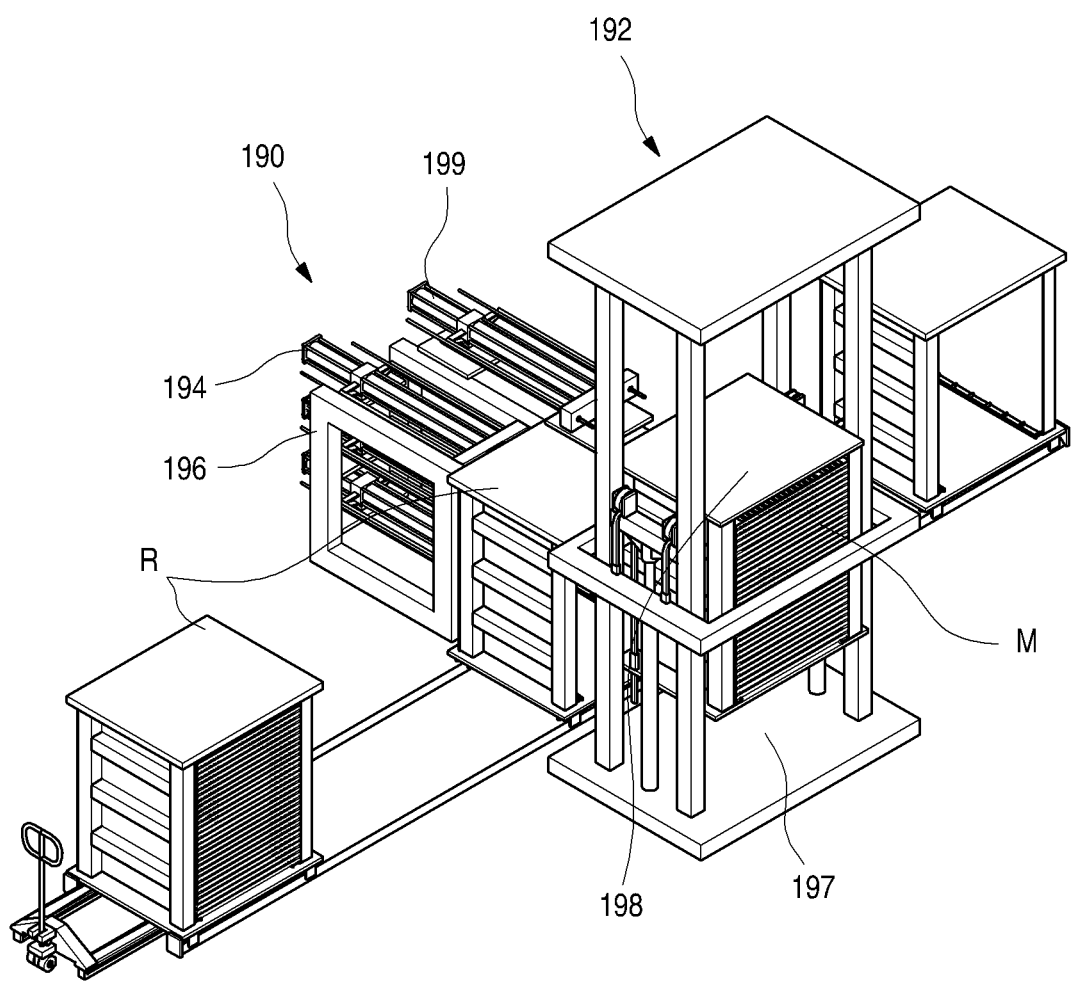
FIG. 14 is a perspective view illustrating arrangement of a mold supply unit and a rack supply unit which are components in the apparatus for manufacturing artificial marble according to the present invention.

FIG. 14 is a perspective view illustrating the arrangement of a mold supply unit 192 and the rack supply unit 190 which are components in the apparatus for manufacturing artificial marble 100 according to the present invention.

As illustrated in the drawing, the rack supply unit 190 is configured to push a plurality of molds M into the mold supply unit 192 in the right direction while placing the rack R accommodating and laminating therein a plurality of molds M from which artificial marbles 1 are separated, and also includes a plurality of cylinders 194 for extension and reduction.

The mold supply unit 192 allows the rack R to be pushed to the right direction in such a manner that the right end of the mold supply unit 192 rectilinearly reciprocates in the state in which the mold supply unit 192 is fixed to a fixed board 196.

The mold supply unit 192 is provided in the right side of the rack supply unit 190. The mold supply unit 192 has a mold accommodation space 197 elongated in the vertical direction to accommodate a plurality of molds M therein. An elevator 198 is installed in the mold supply unit 192 to move the molds M in the upward and downward direction.

An ejector 199 is provided above the rack supply unit 190 to supply the molds M, which are lifted up from the mold accommodation space 197, to the mold guide unit 150 one by one.

The ejector 199 is configured such that the length thereof is extended and reduced and an ejecting plate having a thickness smaller than the thickness of the mold M is provided at the right end of the ejector so as to interlock therewith, thereby pushing the mold M to the right direction one by one.

Accordingly, the apparatus for manufacturing artificial marble 100 having the above configuration can continuously perform a series of processes from the supply of the mold M to the extraction of the rack R.

While the present invention has been described with respect to the specific embodiments, it will be apparent to those skilled in the art that various changes and modifications may be made without departing from the spirit and scope of the invention as defined in the following claims.

The invention claimed is:

1. A system for manufacturing artificial marble, comprising: a granite soil storage unit configured to supply a granite soil by storing, drying, and heating it; a granite soil heating unit configured to heat the granite soil supplied from the granite soil storage unit; a resin storage unit configured to store a thermoplastic polyurethane (TPU) resin maintained in a solid phase at room temperature; a mixing-transporting unit configured to accommodate the TPU resin and the heated granite soil from the granite soil heating unit therein and then melting and mixing them to produce and simultaneously transport an artificial marble slurry; a material guide unit configured to guide the granite soil and the TPU resin into the mixing-transporting unit; a discharge unit configured to discharge the artificial marble slurry mixed in the mixing-transporting unit by a certain amount; a mold supply unit configured to continuously supply a mold for accommodating and molding the artificial marble slurry therein; a mold guide unit configured to guide the mold supplied from the mold supply unit downward of the discharge unit to accommodate the artificial marble slurry in the mold; a forming unit configured to form an artificial marble by applying vibration and pressure to the artificial marble slurry accommodated in the mold; an extraction unit configured to extract the mold accommodating the artificial marble; and a lamination unit configured to laminate and store the mold extracted by the extraction units wherein the granite soil storage unit has a dehumidification function for removing water from the granite soil, and wherein the granite soil heating unit comprises a low temperature portion having a heating temperature of 100 to 300° C., an intermediate temperature portion having a heating temperature of 150 to 350° C., and a high temperature portion having a heating temperature of 200 to 400° C., and the granite soil is gradually heated to a temperature of 150 to 250° C.

2. The system according to claim 1, wherein the mixing-transporting unit forms the artificial marble slurry by melting and mixing the granite soil and the TPU resin through rolling by self-weight, thereby minimizing damage and abrasion of the granite soil.

3. The system according to claim 2, wherein the material guide unit comprises: a granite soil flow pipe for guiding the granite soil into the mixing-transporting unit; and a resin flow pipe for guiding the TPU resin into the mixing-transporting unit in a state in which it is partitioned from the granite soil flow pipe.

4. The system according to claim 3, wherein the discharge unit is narrowed in internal size toward its lower portion to collect the artificial marble slurry supplied from the mixing-transporting unit by a certain amount and then continuously discharge it by self-weight, and a pressure of 0.1 to 1 kgf/cm$^2$ is applied to the artificial marble slurry during discharge.

5. The system according to claim 4, wherein the mold guide unit moves the artificial marble slurry, which is discharged from the discharge unit, at a downward angle of 20 to 35° to guide it into the mold.

6. The system according to claim 5, wherein the mold guide unit has a temporary-forming part provided at one side thereof to pressurize and form the artificial marble slurry that is discharged from the discharge unit and accommodated in the mold.

7. The system according to claim 6, wherein the forming unit laminates a plurality of molds accommodating the artificial marble slurry to apply a load of 0.1 kgf/cm$^2$ to 1 kgf/cm$^2$ to a mold located at the lowermost position while providing vibration to the mold, the extraction unit extracts the mold located at the lowermost position, and a mold laminated at the uppermost position is extracted by the extraction unit in a state in which the artificial marble is completed after 5 to 20 minutes.

8. The system according to claim 7, wherein the forming unit comprises: a lamination space that is open at a portion of a side surface thereof and its upper portion for lamination of the plurality of molds; a lifter configured to rectilinearly reciprocate in a vertical direction outside the lamination space; a load removal part extended and reduced in a direction of the molds, the load removal part being coupled to one side of the lifter to remove a load applied to the lowermost mold by vertical interlocking; a pedestal supporting the molds transported by the a loader to laminate the molds in the lamination space, the loader allowing the mold to be seated in the lamination space; and a vibration generator for providing vibration to the molds.

9. The system according to claim 8, wherein the lamination unit accommodates a rack for laminating the plurality of molds, and the rack is moved up and down by an elevation device.

10. The system according to claim 9, wherein a rack supply unit is provided in the vicinity of the mold supply unit to supply the rack accommodating therein the plurality of molds from which the artificial marble is separated into the mold supply unit.

\* \* \* \* \*